Figure 1:
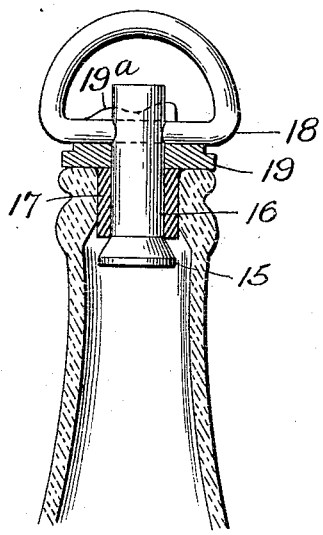

D. BAXTER.
BOTTLE AND JAR STOPFER.
APPLICATION FILED JULY 2, 1907.

932,948.

Patented Aug. 31, 1909.
2 SHEETS—SHEET 1.

David Baxter,
Inventor

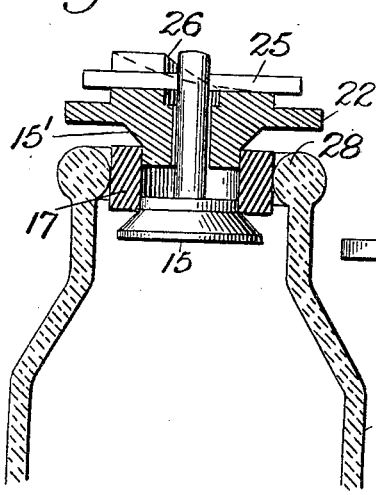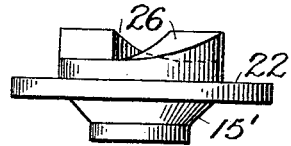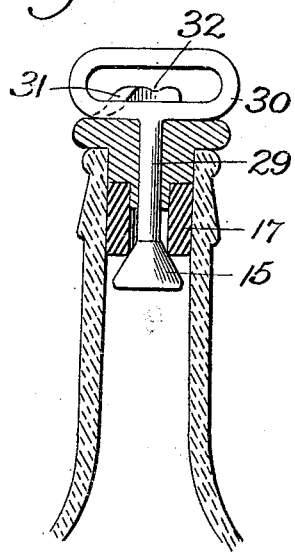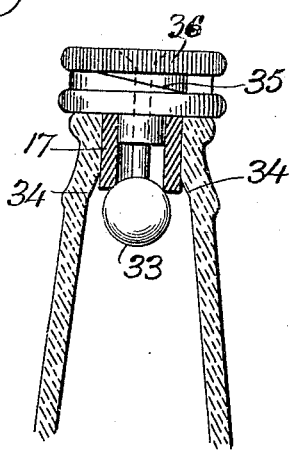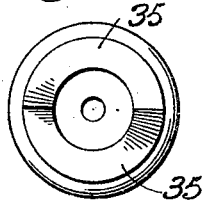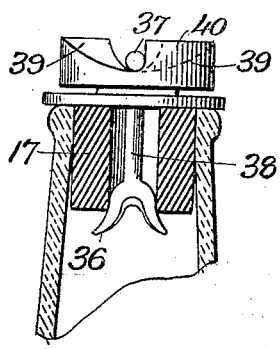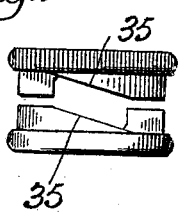

UNITED STATES PATENT OFFICE.

DAVID BAXTER, OF NEW YORK, N. Y.

BOTTLE AND JAR STOPPER.

932,948.

Specification of Letters Patent.  Patented Aug. 31, 1909.

Application filed July 2, 1907.  Serial No. 381,820.

*To all whom it may concern:*

Be it known that I, DAVID BAXTER, a subject of the King of Great Britain, residing at New York, in the county of New York and State of New York, have invented new and useful Improvements in Bottle and Jar Stoppers, of which the following is a specification.

This invention relates to bottle or jar stoppers and has for its object to provide a closure which is adapted to thoroughly fit the neck of a bottle and not only confine the liquid but prevent the escape of gas with which certain liquors and beverages are charged, the stopper being secured and released as will be more fully explained together with the construction of the stopper, in the following specification, set forth in the claim and illustrated in the drawings where it will be seen that like reference characters are used to designate the same parts in the various views.

Figure 2:
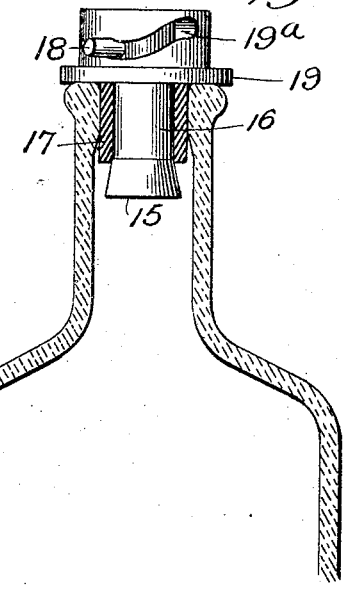

Figure 1 is a sectional view of the neck of a bottle showing the simplest form of my improved stopper applied thereto. Fig. 2 is a view similar to Fig. 1 showing a slightly modified form of my invention. Fig. 3 is a similar view showing a further modified form. Fig. 4 is a side view of the cam face used to close the stopper shown in Fig. 3. Fig. 5 is a sectional view of a further modified form of my invention. Fig. 6 is a plan view of the form shown in Fig. 5. Fig. 7 is a sectional view showing a still further modified form. Fig. 8 is a top plan view of one of the cam faces employed in the form shown in Fig. 7. Fig. 9 is a side view of the cam faces. Fig. 10 is a sectional view showing another modified form of my invention.

This invention consists primarily of a plug or wedge 15 as shown in Fig. 1, with a stem 16 and means for drawing the stem upward so that the wedge is drawn into a sleeve 17 of rubber or similar material, expanding the same so that it not only completely fills the mouth of the bottle and the interior of the neck but the frictional nature of the rubber causes the same to bind and it is rigidly retained therein with the other parts of the closure. The stem 16 is in this instance provided with a cross bar and bail 18, and a washer 19 is interposed between the said cross bar and the sleeve 17. The upper face of the washer is provided with inclined cam faces 19ª terminating in notches to retain the cross bar when it is turned and rides up the inclined cam faces. The outer walls of the sleeve may be tapered or wedge-shaped so that as the wedge 15 is entering its interior it is expanded evenly and its outer face fits the interior of the neck with an even pressure throughout.

In the modified form of my invention shown in Fig. 2 the cross bar 18 plays in an inclined cam slot 19ª in the sides of a washer or cap 19 and as the bar moves up the incline it draws the wedge into the sleeve and expands it.

In order to effect an immediate location or release of the stopper the means illustrated in Fig. 3 and the following views may be adopted and in the former view the usual wedge and sleeve are employed but an additional wedge 15' is formed on the lower side of the washer 22 while the stem of the plug or wedge 15 is provided with a cross piece 25 which is adapted to ride up the inclined cam faces 26 thus drawing the two wedges together and expanding the sleeve. The mouth of the jaw 27 has an internal bead 28 and when the sleeve 17 is compressed it partly envelops the bead and forms a very effective closure.

In small bottles a cross bar is not sufficient, nor is it in stoppers using a single wedge so the upper end of the stem 29 in Fig. 5 is shown as being provided with a loop or head 30 which may be easily turned by the operator so as to ride up the inclined faces 31 and into the notches 32 which hold the head and wedge 15 in their operative positions.

Figs. 7, 8 and 9 illustrate a modified form of arrangement in which the ball 33 forms the wedge and forces the sleeve 17 against the inclined entrance 34 to the mouth of the bottle. The ball 33 is drawn upward into the interior of the sleeve by the action of the inclined cam faces 35 as the head 36 is turned to the left.

In the form shown in Fig. 10 a forked shaped wedge 36' is operated by the cross piece 37 of the stem 38 riding up the inclined faces 39 of the head 40 as it is turned. These forms of bottle stoppers not only afford a perfect closure for a bottle or jar but when used in conjunction with various ribs or beads at the mouth of the bottle add to its efficiency in preventing the leakage of liquid or gas and is admirably adapted to bottles charged with considerable pressure.

The plug which plays so important a part in this closure and covers nearly the whole of the interior surface of the cork receives the pressure of the liquid or gas which serves materially to press the plug into the sleeve and expand the same. In some instances this method of forcing the plug into the sleeve and retaining it there may be resorted to.

It is obvious that other modifications may be resorted to without departing from the spirit of the annexed claim.

What I claim as new and desire to secure by Letters Patent is:

The combination with a flexible sleeve adapted to fit in the mouth of the bottle or jar, of a plug extending through and free to move longitudinally in the sleeve and having a wedge acting device, means to bear on the mouth of the bottle or jar forming a guide for the said plug and having inclined cam faces and locking means connected to said plug and coacting with said cam faces to move said plug in one direction and cause the wedge acting device thereof to expand the sleeve diametrically and to fit the same closely in the mouth of the bottle or jar.

In testimony whereof, I affix my signature in presence of two witnesses.

DAVID BAXTER.

Witnesses:
JAMES F. DUHAMEL,
K. ALLEN.